United States Patent [19]
Lorriette et al.

[11] Patent Number: 5,697,251
[45] Date of Patent: Dec. 16, 1997

[54] GEARSHIFT CONTROL SYSTEM

[75] Inventors: Patrick Lorriette, Clermont de l'Oise; Gilles Hoessler, Beauvais; Denis Gouardo, Berneuil-en-Bray, all of France

[73] Assignees: Massey Ferguson SA; Renault Agriculture SA, both of France

[21] Appl. No.: 666,977

[22] Filed: Jun. 20, 1996

[30] Foreign Application Priority Data

Jun. 23, 1995 [GB] United Kingdom ............ 9512838

[51] Int. Cl.$^6$ ............................................. F16H 61/06
[52] U.S. Cl. .............................. 74/335; 192/85 C
[58] Field of Search ................ 74/335; 192/85 C, 192/109 F

[56] References Cited

U.S. PATENT DOCUMENTS

| | | | |
|---|---|---|---|
| 3,596,742 | 8/1971 | Zierak et al. | 192/85 A |
| 3,674,121 | 7/1972 | Copeland | 192/109 F |
| 4,262,784 | 4/1981 | Sibeud | 192/85 C |
| 4,555,959 | 12/1985 | Braun | 74/335 |
| 4,560,044 | 12/1985 | Nagata . | |
| 4,653,352 | 3/1987 | Nakao et al. | 74/335 |
| 4,998,443 | 3/1991 | Janisewski | 74/335 |
| 5,092,187 | 3/1992 | Irwin | 74/335 |

FOREIGN PATENT DOCUMENTS 1020405 2/1966 United Kingdom .

*Primary Examiner*—Dirk Wright
*Attorney, Agent, or Firm*—MacMillan, Sobanski & Todd

[57] ABSTRACT

A control system for a synchromesh unit, particularly suitable for controlling a synchromesh in a forward/reverse pre-select gear change system. The system is purely hydraulic, incorporating a double acting hydraulic cylinder (1) for moving the synchromesh. The hydraulic circuit controlling the hydraulic cylinder (1) includes restrictions ($R_1$), ($R_{2A}$), ($R_{2B}$) and an accumulator (10), which vary the force applied by the hydraulic cylinder (1). The variation of the force applied by the hydraulic cylinder (1) includes a gradual, progressive increase of force whilst the synchromesh is matching its speed to the gear to be engaged, and subsequently allowing the synchromesh mechanism to move rapidly once its speed is matched with the gear to be engaged, to quickly move the teeth of the synchromesh and the gear to be engaged together. The force applied by the hydraulic cylinder is then increased again to a maximum once the synchromesh is fully engaged.

10 Claims, 2 Drawing Sheets

GEARSHIFT CONTROL SYSTEM

BACKGROUND OF THE INVENTION

The present invention relates to a gearshift control system for controlling a hydraulically actuated synchromesh mechanism for changing gear in a gearbox. The system has particular application in, for example, a forward/reverse pre-select gear change system for a tractor, but the invention is not restricted to this application.

A problem with some present hydraulically actuated synchromesh mechanisms is the abruptness with which they transfer their engagement from one gear to another, sometimes with corresponding jerking being transmitted to the driving wheels of the vehicle. This is particularly apparent in a tractor fitted, for example, with a forward/reverse gear change system involving a hydraulically actuated synchromesh. In one such system, hydraulic pressure is supplied to the cylinder or cut-off therefrom by means of simple hydraulic on/off valves which are electronically controlled. In this case, it has been found in some instances that the synchromesh engages the next gear too suddenly resulting in jerking of the tractor. Solutions have been proposed involving electronic control of the synchromesh so that it is engaged gradually. Such solutions tend to be expensive, however, principally because they involve the use of multiple pulse width modulation controlled electro-hydraulic valves.

FIG. 1 illustrates schematically a driveline where this problem is particularly apparent.

Referring to FIG. 1, the problem described above is particularly evident in a tractor having a driveline where the main clutch 21 is not adjacent to the forward/reverse gearset 22. In such a driveline, there may be, for example, a powershift gear train 23 between the main clutch 21 and the forward/reverse gearset 22. In this case, when a forward/reverse change is made, the powershift gear train 23 must reverse its direction when a shift is made in the forward/reverse gearset 22, which requires a substantial torque if it is done suddenly. This torque can be transmitted via eg another gear train 24 and the rear axle 25 to the driving wheels 26 of the tractor, causing a jerk.

SUMMARY OF THE INVENTION

It is an object of the present invention to overcome or at least alleviate the jerkiness encountered in the above described forward/reverse gear change, at relatively low cost. However it will be appreciated that the present invention applies to the control of any hydraulically actuated synchromesh to improve its smoothness.

A further problem encountered whilst attempting to solve the jerkiness problem is the temperature sensitivity of some types of hydraulic control system, and further preferable features of the present invention address this problem.

According to the present invention, a gearshift control system is provided according to Claim 1 of the Claims hereto. In this system, the selection of the dimensions of the first restriction and the properties of the hydraulic accumulator can be made such that the synchromesh is gradually engaged. Electronic control, and expensive pulse width modulation electro-hydraulic valves are unnecessary.

Preferable features are identified in the dependent Claims.

DESCRIPTION OF THE PREFERRED EMBODIMENT

Although the concepts claimed in the present specification are applicable to the control of a synchromesh gear change in a great many different applications, this specific description is confined to the control of a synchromesh in a forward/reverse pre-select gear change system in a tractor.

Figure 1:
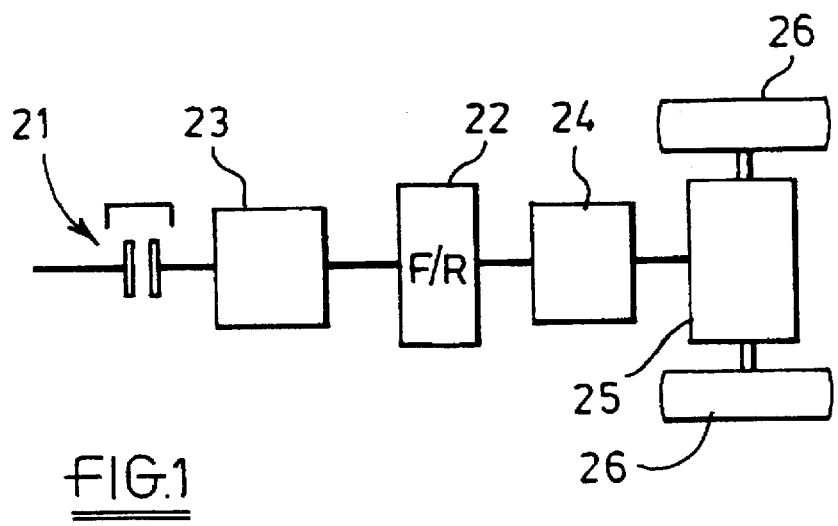
Figure 2:
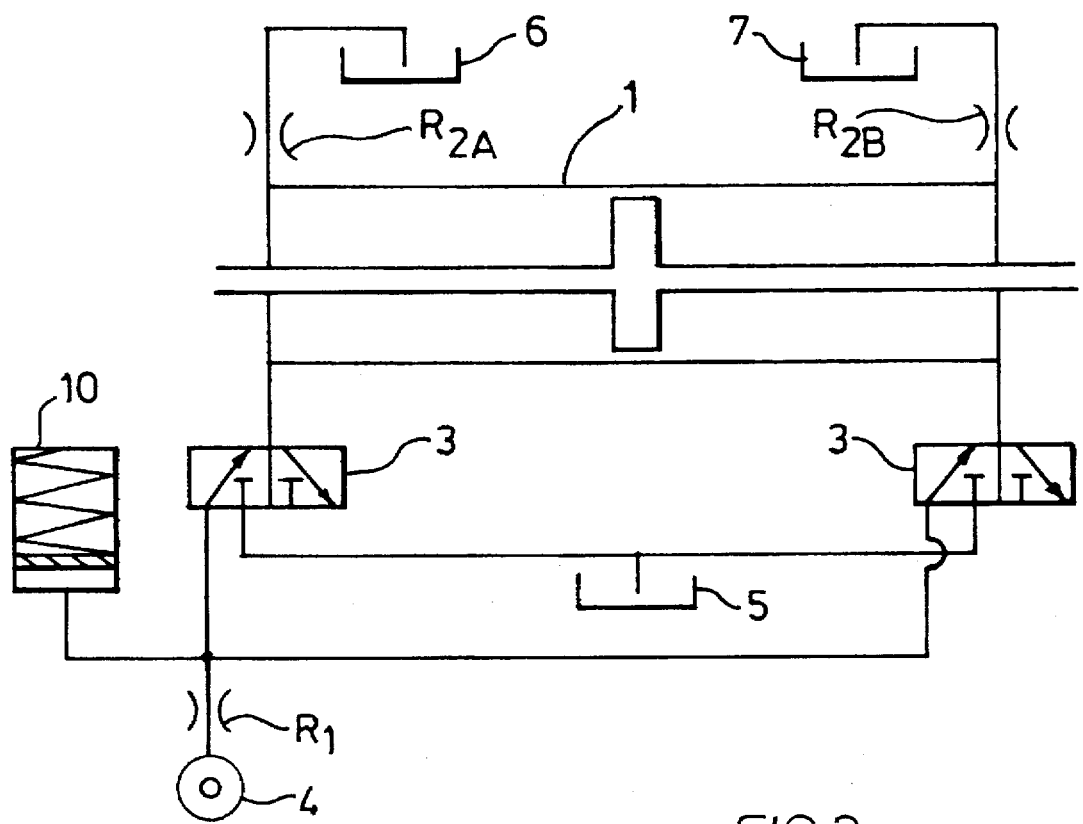
FIG. 2 is a schematic representation of a synchromesh mechanism control system in accordance with the present invention.

Referring firstly to FIG. 2, the pre-select system comprises a double acting hydraulic cylinder 1 connected to a synchromesh moving fork (not shown). The fork acts on a synchromesh unit (not shown) which effects a change between forward and reverse gears. The hydraulic cylinder 1 is controlled by two simple on/off hydraulic valves 3 which enable or disable the supply of hydraulic pressure to each side of the double acting cylinder 1. The position of the valves 3 is controlled electronically via a microprocessor in dependence on a number of inputs, including those from a forward/reverse pre-select button, a sensor sensitive to depression of the clutch pedal in the tractor and a tractor speed sensor. When the necessary conditions for a forward/reverse gear change are met, the microprocessor will command the valves 3 to alter the supply of pressure from one side of the cylinder 1 to the other, in order to effect a gear change.

The valves 3 are supplied from a hydraulic pressure source 4 at a given supply pressure, via a restriction $R_1$. The valves are also connected to a source of zero hydraulic pressure 5. Also connected to the pressure supply 4, after the restriction R1, is an accumulator 10 which in this case is a piston type or mechanical accumulator but could be a diaphragm or bladder-type or gas type accumulator. A further source of zero hydraulic pressure 6, 7 is connected to each side of the cylinder via respective restrictions $R_{2A}$, $R_{2B}$.

The restriction $R_1$ is, in relative terms, of "large" diameter, and is relatively short. By the term "short" it is meant that the dimension of the restriction in the axial direction, along the length of the hydraulic line, is relatively short, in this case. These characteristics of the restriction $R_1$ mean that the flow through it is principally turbulent, although there will inevitably, to some extent, be a mixture of laminar flow and turbulent flow through it. The restrictions $R_{2A}$, $R_{2B}$ are of the same dimensions as each other. Each of these restrictions has a somewhat smaller diameter than the restriction $R_1$. These restrictions are also somewhat longer in the direction along the hydraulic line, than the restriction $R_1$. This configuration of restriction results in principally laminar flow, although again inevitably there will be a mixture of laminar and turbulent flow types through these restrictions as well.

The operation of the control system will now be described with reference to FIGS. 3 and 4 as well as FIG. 2.

Figure 3:
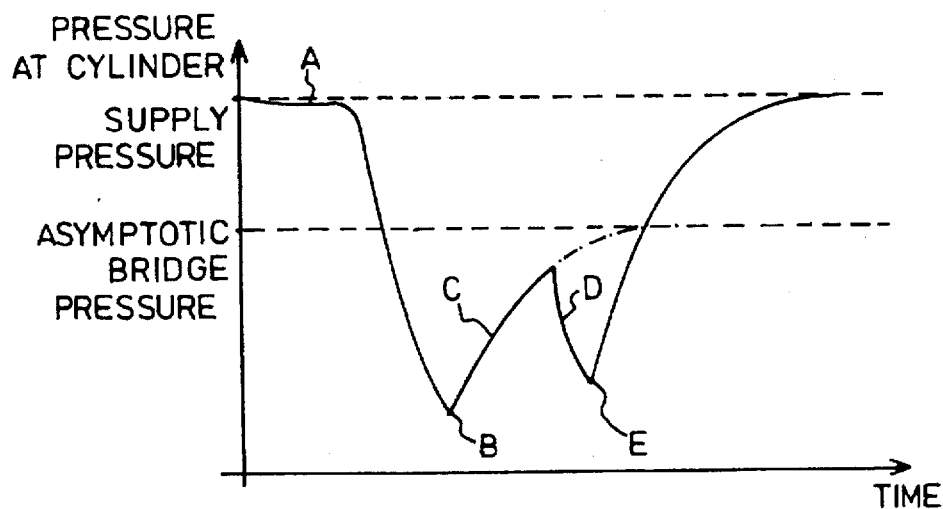
FIG. 3 is a diagram showing the pressure supplied to a hydraulic synchromesh mechanism actuating cylinder in a control system according to the invention.
Figure 4:
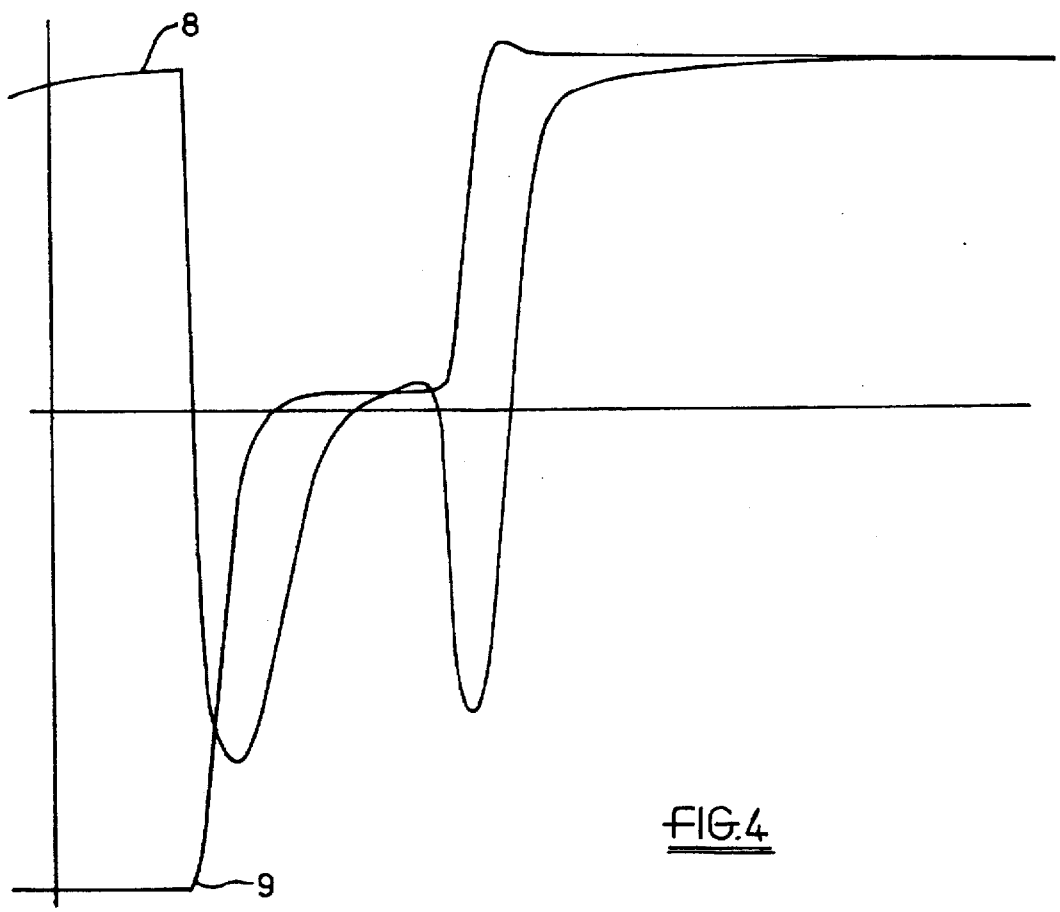
FIG. 4 is a plot of various parameters in a synchromesh control system according to the invention.

FIG. 3, and plot 8 on FIG. 4, represent the hydraulic pressure supplied to one side of the cylinder 1 following the activation of one of the valves 3 and shutting down of the other valve 3 to effect a gear change. Going from left to right on the time axis of FIG. 3, at the start the supply pressure is available to the cylinder, that is to say the highest pressure available from the hydraulic pressure source which is used in the system. This relatively high pressure allows the actuator cylinder to move the synchromesh mechanism with a large force to disengage the synchromesh from the previous gear. This enables any resistance associated with separating the meshing of the synchromesh with the previous gear to be overcome easily.

Turning now to FIG. 4, the position of the synchromesh mechanism is shown as plot 9, with time on the horizontal axis. As can be seen from FIG. 4, the synchromesh mechanism moves rapidly once it has disengaged the previous gear to the point where the friction element of the synchromesh mechanism engages the corresponding friction element on the gear to be engaged. The movement of the synchromesh mechanism is rapid because there is substantially no mechanical resistance offered to the mechanism itself during this stage. Rapid movement is permitted by the hydraulics because of the presence of the accumulator 10 (see FIG. 2).

As is known in the hydraulics art, an accumulator will build up hydraulic fluid under pressure produced, for example, by a mechanical spring. When the hydraulic fluid is required, the fluid which has built up in the accumulator can be released at high speed. The actuator cylinder is thus able to move at high speed once the synchromesh is disengaged from the previous gear, but this period of high speed movement and available hydraulic pressure is limited by the capacity of the accumulator 10. The accumulator is in this case dimensioned so that it is almost empty when the friction element of the synchromesh engages the friction element of the gear to be engaged. The accumulator does not empty completely, since this would cause a jerk in the hydraulic circuit which could be transmitted to the driving wheels.

At this stage, it is desirable for the force between the friction element on the synchromesh and the friction element on the gear to be engaged to be built up progressively so that the gear train connected to the synchromesh is decelerated and its direction changed smoothly. This is, as explained previously, especially important in a drive train where the reversing gear is not positioned immediately adjacent to the main clutch.

At this stage in the gear engaging process, the pressure available to the actuator is at a minimum following emptying of the accumulator. As the accumulator fills up again, the maximum available pressure which can be attained at the cylinder is determined by the difference in the pressure drop across resistance $R_{2A}$ or $R_{2B}$ as appropriate and the pressure drop across $R_1$. During this stage also, the rate at which the available pressure at the cylinder can increase is also determined by the characteristics of $R_1$ and $R_{2A}$ or $R_{2B}$ as appropriate. Turning now to FIG. 3, the line representing available pressure at the cylinder has progressed from a maximum A as the synchromesh is disengaged from the previous gear, rapidly down to a minimum at B as the accumulator 10 empties as the synchromesh mechanism moves from engagement with the previous gear to the point at which its friction element and that of the gear to be engaged are just in contact. The pressure curve in FIG. 3 then rises gradually at C towards an asymptotic pressure determined by the hydraulic bridge. Both the shape of the curve C and the asymptotic hydraulic pressure may be determined by adjusting the dimensions of the restriction $R_1$ and the restrictions $R_{2A}$ and $R_{2B}$. Thereby, the time taken and smoothness of the engagement of the synchromesh with the selected next gear can be optimised.

During stage C, the accumulator 10 will gradually fill up. At some stage, which will be before the asymptotic pressure is reached, the end of stage C is determined by the friction elements of the synchromesh and the gear to be engaged matching their speed. At this point, the positive engagement elements of the synchromesh and the positive engagement elements of the gear to be engaged are free to interlock to achieve full engagement of the next gear. At this point, the synchromesh will again tend to move rapidly to a position where the positive engaging elements of the synchromesh and the gear to be engaged are fully interlocked. This stage is represented on the pressure diagram of FIG. 3 by D, where the accumulator discharges thus allowing rapid movement of the cylinder 1 and consequently the synchromesh mechanism, whilst the available pressure at the cylinder decreases as the accumulator empties. This is an "elastic" portion of the hydraulic pressure curve, whose properties are principally governed by the accumulator and are in fact very suitable for this portion of the travel of the synchromesh.

Once the synchromesh is fully engaged, point E is reached and the pressure available at the hydraulic actuator cylinder increases again to the supply pressure so that the stationary synchromesh is engaged with the new gear with the maximum possible force.

In a simplified version of the control system, the restrictions $R_{2A}$ and $R_{2B}$ and connections from each side of the actuator cylinder to sources of zero pressure 6, 7 are omitted. In this case, the curve C in FIG. 3 will aim towards an asymptote at the supply pressure, since there is no longer a hydraulic bridge. The gradient of the curve C will be determined by the pressure drop across the restriction $R_1$. This arrangement has been found in practice to work adequately in most circumstances.

The simplified system can, however, be sensitive to low temperatures and consequent increased viscosity of the hydraulic fluid. Increased fluid viscosity will, in general terms, cause the whole system to function more slowly which can cause the engagement of the synchromesh to be too gradual. Added to this, the pressure drop across the restriction $R_1$ will increase, thus reducing the available pressure at the hydraulic actuator, making its movement even slower. Ideally, the available pressure at the actuator should increase when the temperature drops, to compensate for the general slowing effects of the increased fluid viscosity.

The incorporation of connections from each side of the hydraulic actuator to sources 6, 7 of zero pressure via restrictions $R_{2A}$ and $R_{2B}$ alleviates this problem. The restrictions $R_{2A}$, $R_{2B}$ have principally laminar characteristics and are very temperature sensitive, whereas the restriction $R_1$ having principally turbulent characteristics, is less temperature sensitive. Accordingly, at low temperature, for example, the temperature drop across $R_{2A}$ or across $R_{2A}$ will increase very substantially whereas the temperature drop across $R_1$ will increase, but not to such a great extent. Thus, the available pressure at the hydraulic actuator will decrease less than it would if there were no second restrictions, and may actually increase as the temperature drops, providing compensation for the effects of increased fluid viscosity. The system with two restrictions is therefore considerably more temperature tolerant than the system with only one restriction.

Whether one or two restrictions are employed, the dimensions of the restriction or restrictions are still to some extent a compromise because ideally the shape of the curve C would vary with the speed of the tractor. In a modification of the system, therefore, variable restrictions could be provided which could be linked to the electronic pre-select control, for example. Alternatively, different restrictions could be provided in parallel, for example, at $R_1$ and the path of the hydraulic fluid could be selected to go through one or the other restriction depending on the tractor speed. This would necessitate an electronically controlled valve between the restrictions $R_1$ and the hydraulic supply.

What we claim is:

1. A gearshift control system comprising at least one hydraulic actuator for applying force to a synchromesh mechanism, and a hydraulic circuit connected to each said actuator, said circuit comprising:

(a) a source of pressurised hydraulic fluid;
   (b) a source of hydraulic fluid at substantially zero pressure;
   (c) valve means connected to said source of pressurised hydraulic fluid, to said zero pressure source, and to each said hydraulic actuator;
   (d) a first restriction between said pressurised fluid source and said hydraulic actuator; and
   (e) a hydraulic accumulator, said accumulator being connected into said circuit between said first restriction and the valve means.

2. A system as claimed in claim 1, wherein said valve means comprises two valves, each said valve being connected via said first restriction to said source of pressurised hydraulic fluid said circuit being split into two separate hydraulic lines at a point between said first restriction and said valves, said accumulator being connected into said hydraulic circuit between said first restriction and said point at which said circuit splits to supply said valves.

3. A system as claimed in claim 1, wherein said actuator is connected to said source of zero pressure or to a further source of zero hydraulic pressure via a hydraulic line having a second restriction, said first and second restrictions forming a hydraulic bridge.

4. A system as claimed in claim 3, wherein said first restriction is arranged to create a pressure drop which is less sensitive to ambient temperature than that created by said second restriction.

5. A system as claimed in claim 4, wherein said first restriction is proportioned to cause principally turbulent flow through said first restriction, and said second restriction is proportioned to cause principally laminar flow through said second restriction.

6. A system as claimed in claim 1 wherein said actuator comprises a double acting hydraulic cylinder.

7. A system as claimed in claim 1, wherein the actuator comprises two separate hydraulic cylinders.

8. A synchromesh gearbox including a gearshift control system as claimed in claim 1.

9. A synchromesh gearbox including a pure hydraulic system for automatically controlling the force exerted by and/or speed of movement of a synchromesh mechanism in said gearbox during a gear change, said hydraulic system including one or more restrictions and/or one or more accumulators.

10. A gearshift control system comprising at least one hydraulic actuator for applying force to a synchromesh mechanism, and a hydraulic circuit connected to each said actuator, said circuit comprising:

(a) a source of pressurised hydraulic fluid;
   (b) a source of hydraulic fluid at substantially zero pressure;
   (c) valve means connected to said source of pressurised hydraulic fluid, to said zero pressure source, and to each said hydraulic actuator;
   (d) a first restriction between said pressurised fluid source and said hydraulic actuator;
   (e) a hydraulic accumulator, said accumulator being connected into said circuit between said first restriction and the valve means, said actuator being connected to said source of zero pressure or to a further source of zero hydraulic pressure via a hydraulic line having a second restriction, said first and second restrictions forming a hydraulic bridge.

* * * * *